Feb. 3, 1959  J. DOLZA  2,871,842
CHARGE FORMING MEANS FOR AN INTERNAL COMBUSTION ENGINE
Filed May 31, 1955

INVENTOR
John Dolza
BY
L. D. Burch
ATTORNEY

United States Patent Office 2,871,842
Patented Feb. 3, 1959

2,871,842

CHARGE FORMING MEANS FOR AN INTERNAL COMBUSTION ENGINE

John Dolza, Davisburg, Mich., assignor to General Motors Corporation, Detroit, Mich., a corporation of Delaware Application May 31, 1955, Serial No. 511,955

17 Claims. (Cl. 123—119)

The present invention relates to internal combustion engines and more particularly to induction systems and means for forming the combustible charge therein.

In the operation of an internal combustion engine of the so-called spark ignited type, a combustible charge is formed and then compressed within a cylinder where it is then ignited and allowed to expand. In order to obtain the maximum power per cubic inch of displacement, it is desirable to introduce as large a volume of the charge into the cylinder as is possible. In other words it is desirable to obtain a high volumetric efficiency. In order to achieve this objective the obstructions to the flow of the charge through the induction system must be minimized. In addition means may be provided for supercharging the engine by the use of intake passages that are tuned to resonate at one or more engine operating conditions. Thus at or near this condition the charge will surge through the intake passages in a resonant manner and thus tend to supercharge the engine. In all of the systems of this nature which have been developed heretofore, there has been considerable trouble in properly metering and mixing the fuel into the charge and/or in throttling of the charge.

It is now proposed to provide charge forming means for an engine that will insure a high volumetric efficiency and a proper metering of the fuel and air at all times. This is to be accomplished by employing an air box having a single intake with a throttle valve disposed therein for throttling the volume of air flowing therethrough. This air box may be connected to each of the cylinders by separate intake passages. Each of these intake passages may be substantially identical to each other and they may be dimensioned to resonate or tend to resonate at one or more engine operating conditions. Thus when the engine is operating at this condition, the charge in the passage will be flowing toward the intake valve with a considerable velocity at the time the intake valve opens. Since the charge will have a relatively high velocity, the charge will tend to be rammed into the engine cylinders and thus produce a very high volumetric efficiency. Since all of the charge must flow through the single throttle valve, the charge may be easily throttled and all of the cylinders will receive identical amounts of the charge even when the throttle valve is in the idle position.

To further reduce the restrictions to the flow of air into the engine and to provide a more uniform charging of the cylinders, the charge may be formed by injecting separate quantities of fuel directly into the separate surges of the charges immediately adjacent the points where they flow into the cylinders. Since the quantity of fuel to be injected will be a function of the quantity of air flowing into the engine, control means may be provided that are responsive to this quantity of air. Although any suitable control means may be employed, in the present instance the control means are responsive to the air pressure in the air box, i. e., the pressure of the air between the throttle valve and the intake passage. This is accomplished by means of a diaphragm in one way of the air box which has one side exposed to the atmosphere and the other side to the air pressure in the air box. This diaphragm is connected to a pump so that movement of the diaphragm will vary the output of the pump. Thus the fuel will be metered without employing any flow restricting venturi.

Figure 1:
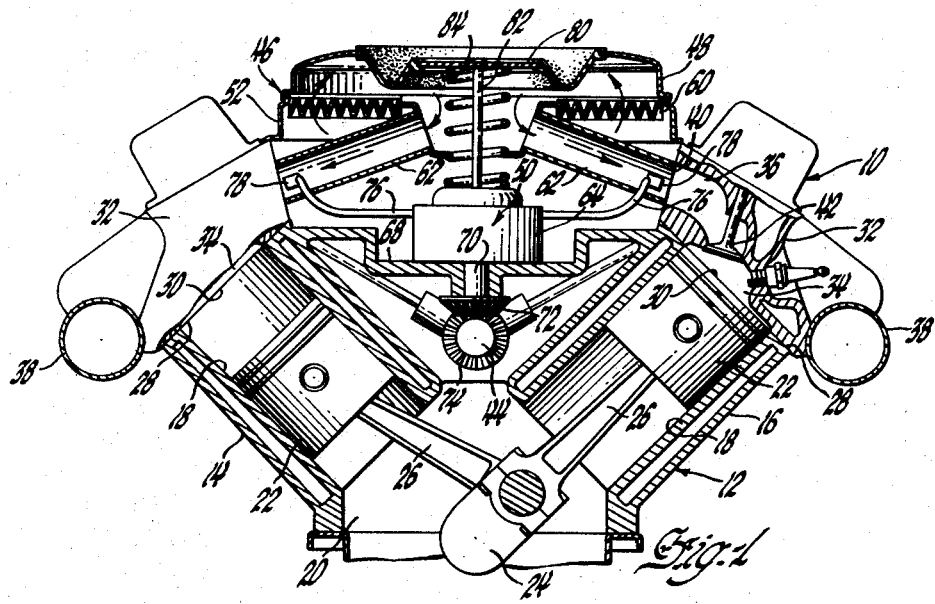
Figure 1 is a cross sectional view of an engine embodying the present invention.
Figure 2:
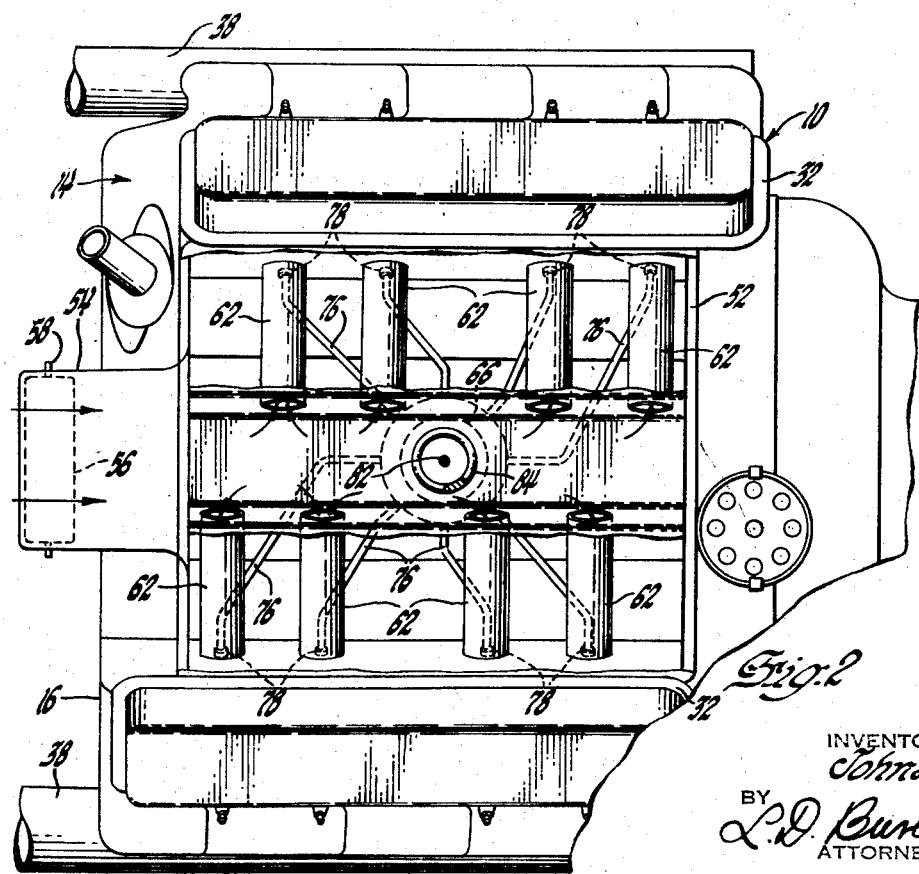
Figure 2 is a plan view of the engine in Figure 1 with portions thereof being broken away.

Referring to the drawings in more detail, this invention may be adapted for use on any suitable engine 10. The present engine 10 is of the so-called V-type having a cylinder block 12 with a pair of angularly disposed banks of cylinders 14 and 16. Each of these banks 14 and 16 may include a plurality of cylinders 18 that extend therethrough so as to open into a crankcase 20 formed in the bottom of the cylinder block 12. A piston 22 may be reciprocably disposed in each cylinder 18 and connected to a rotating crankshaft 24 by means of a piston rod 26. A plane face 28 may extend along the top of each cylinder bank 14 and 16 with the cylinders 18 forming a plurality of openings 30 therein. A cylinder head 32 may be secured on each face 28 to close the open ends of the cylinders 18. Cavities 34 may be formed in the heads 32 to register with the openings 30 and together with the pistons 22 form combustion chambers.

Exhaust passages and intake passages 36 may be provided which extend transversely through the cylinder heads 32. The inner ends of these passages may form valve seats on the walls of the cavities 34 so as to communicate with the combustion chambers. The opposite ends of the exhaust passages may extend outwardly from the combustion chambers to form exhaust ports on the outer sides of the heads for discharging the exhaust gases therefrom. Exhaust manifolds 38 may extend along the outer sides of the engine 10 to register with the exhaust ports and to collect and direct the exhaust gases into an exhaust system for discharging the gases into the atmosphere.

The opposite ends of the intake passages 36 may extend through the cylinder heads 32 towards the center of the engine 10. Thus the ends of the intake passages 36 will form intake ports 40 on the inner sides of the cylinder heads 32. In order to control the flow of the charge into the combustion chambers, intake valves 42 may be provided in the intake valve seats. A camshaft 44 driven by the crankshaft 24 may be provided for opening and closing these valves.

Charge forming means 46 may be provided for supplying the cylinders with a combustible mixture of air and fuel. The present charge forming means 46 includes an induction system 48 and a fuel supply system 50. The induction system 48 may include an air box 52 that is mounted in the space between the cylinder banks 14 and 16 immediately above the camshaft gallery. The intake 54 to the air box 52 may include a duct that projects from the front end of the engine 10. Thus the air may be drawn from the atmosphere through the intake 54 into the air box 52 before it is heated by the engine 10. In order to control the volume of air entering the engine 10, a throttle valve 56 may be disposed in the intake 54. The present throttle valve 56 is of the so-called butterfly type and is mounted on a shaft 58 extending across the intake 54. The position of the valve 56 may be controlled by an operator rotating the shaft 58 by any suitable linkage system. Since there is only one throttle valve 56, the operator will have an accurate and positive control over the quantity of air entering the engine 10.

If desired, a filter element 60 may be horizontally disposed across the air box 52 so as to divide it into an upper compartment and a lower compartment. The air passing through the intake 54 may flow into the lower compartment and through the filter element into the upper compartment. However, the filter element may be disposed at any desired location.

A separate intake pipe 62 may be provided for each of the cylinders for interconnecting the cylinders with the air box 52. The ends of each pipe 62 may register with the intake ports 40 so that the pipes 62 will form continuations of the intake passages 36. These are preferably all identical with each other. The opposite ends of the pipes 62 may be disposed in the upper compartment so that they are free to draw the filtered air therefrom. Thus the air may flow through the throttle valve 56 into the lower compartment, up through the filter element into the upper compartment and then through the intake pipes 62 into the intake passages 36 and combustion chambers.

In order to increase the amount of the charge flowing into the cylinders, each of the individual intake pipes 62 may be made so that the flow therethrough will resonate or tend to resonate at one or more engine operating conditions. That is, the length of the pipe and passage may be correct for the formation of standing waves therein, having a velocity antinode located adjacent the intake valve 42. This will cause the surges of the charge flowing through the intake pipe 62 towards the intake valve 42 when the valve is opening. Thus since the air will be in motion at the time the valve 42 is opening the effects of momentum will not retard the starting of the flow into the cylinders. In addition, the increased velocity of the charge will tend to "pack" or "ram" more air into the cylinder while the valve 42 is open. It should be noted that all of these intake pipes and passages are substantially identical and that all of them draw from an enlarged plenum chamber containing throttled air. As a result all of the cylinders will receive substantially identical charges.

In order to form a combustible charge, the fuel supply system 50 may be an injection system for spraying atomized fuel into the charge. This injection system includes a fuel pump mechanism 64 having a housing 66 mounted on a web 68 extending across the top of the camshaft gallery. A vertical driveshaft 70 may extend downwardly from the pump 64 with a gear 72 on the lower end thereof meshing with a similar gear 74 on the camshaft 44. The present pump 64 includes a separate positive displacement cell for each cylinder. These cells are radially disposed about the driveshaft 70 so as to engage a variable lift cam mounted on the driveshaft 70. A separate fuel line 76 may communicate with each of the cells. The outer ends of the fuel lines 76 may radiate from the pump 64 and be provided with nozzles 78 that are mounted on the cylinder heads 32 so as to be disposed in the intake passages 36 for discharging the fuel into the charge as it flows toward the intake valves 42. In the present instance the fuel pump 64 is driven by the camshaft 44 and the discharging of the cells will be coordinated with the operation of the valves. Thus the nozzles 78 will inject fuel into the intake passage 36 only when the intake valve 42 is open. However, it should be understood that a continuous flow type of injection may be employed.

The quantity of air flowing into the engine 10 will be a function of numerous factors such as the throttle valve setting, the engine speed, etc. Therefore, since the volume of fuel to be injected must be in proportion to the volume of air consumed, means must be provided for sensing the quantity of air flowing through the induction system 48 and for controlling the quantity of fuel discharged from the pump 64 in proportion thereto. Accordingly, a diaphragm 80 may be provided in one wall of the air box 52 with one side thereof being exposed to atmosphere and the other side thereof being exposed to air pressure in the air box 52. This diaphragm 80 is connected to the pump 64 by means of a link 82 and it is opposed by a coil spring 84. Movement of this link 82 is effective to vary the lift of the cam. Since in the present instance, the lift of the cam varies in an axial direction, pressure changes on the diaphragm will move the cam in an axial direction and thereby vary the output of the pump 64 in proportion to the volume of air flowing through the induction system 48.

It may be seen that the large size of the chamber inside of the air box 52 will allow the air to flow freely therethrough with the minimum amount of obstruction. By using a pressure responsive diaphragm 80 for metering the fuel as a function of intake vacuum, there are no venturi or other metering means that will in any way restrict the flow of air through the induction system 48. In addition, the resonating of the charges in the intake pipes 62 will increase the air flow into the cylinders. Thus a high volumetric efficiency will be insured. Since a single throttle valve 56 controls the flow of all of the air and since all of the intake pipes 62 draw from the same plenum chamber, a uniform charging of the cylinders will be provided even during idle conditions.

It is to be understood that, although the invention has been described with specific reference to a particular embodiment thereof, it is not to be so limited since changes and alterations therein may be made which are within the full intended scope of this invention as defined by the appended claims.

I claim:

1. Charge forming means for use on an internal combustion engine having a plurality of cylinders, said charge forming means comprising an air box having an inlet communicating with the atmosphere, throttle means disposed in said inlet for controlling the rate of air flowing therethrough, a plurality of substantially identical intake passage means having the outer ends thereof communicating with said cylinders and the inner ends thereof disposed in said air box, each of said intake passage means being substantially identical with each other and being adapted to dynamically supercharge said cylinders by ram and means for injecting metered quantities of fuel into the charge posterior to said throttle means.

2. Charge forming means for use on an internal combustion engine having a plurality of cylinders, said charge forming means comprising an air box forming a plenum chamber, an inlet interconnecting said plenum chamber with the atmosphere, a throttle valve disposed in said inlet for controlling the rate of air flowing from the atmosphere into said air box, a plurality of intake passages being substantially identical to each other and having the inner ends thereof communicating with the plenum chamber in said air box, the outer ends of each of said passages communicating with said cylinders, each of such intake passages being adapted to cause the flow therethrough to dynamically supercharge said cylinders by ram, fuel supply means responsive to said air flowing through said plenum chamber for injecting fuel into said intake passages in proportion to the volume of said air.

3. Charge forming means for use on an internal combustion engine having a plurality of cylinders, said charge forming means comprising an air box forming a plenum chamber, an inlet interconnecting said plenum chamber with the atmosphere, a throttle valve disposed in said inlet for controlling the rate of air flowing therethrough from the atmosphere into said chamber, a plurality of substantially identical intake ducts having the inner ends thereof communicating with said plenum chamber, the outer ends of each of said ducts communicating with one of said cylinders, each of said ducts being substantially identical to each other and being adapted to dynamically supercharge said cylinders by ram during at least one engine operating condition, a fuel pump adapted to inject fuel into said intake passages for mixing with said air, pneumatic means responsive to the pressure in said plenum chamber and being operatively connected to said pump for varying the output therefrom in proportion to the volume of air in said induction system.

4. Charge forming means for an internal combustion engine having a plurality of cylinders, said charge forming means comprising an air box forming a plenum chamber, an inlet interconnecting said plenum chamber with the atmosphere, a throttle valve disposed in said inlet for controlling the rate of air flowing from the atmosphere into said chamber, a plurality of intake passages having the inner ends thereof communicating with said plenum chamber, the outer ends of each of said passages communicating with one of said cylinders, each of said passages being substantially identical to each other and being adapted to cause the flow therethrough to dynamically supercharge said cylinders by ram during one or more engine operating conditions, a fuel pump for injecting fuel into said air to form a combustible charge, means for varying the quantity of fuel discharged from said pump, said last mentioned means including a diaphragm responsive to the difference between the atmospheric pressure and the pressure inside of said chamber for varying the output of said pump in proportion to the volume of air flowing through said chamber.

5. Charge forming means for an internal combustion engine having a plurality of cylinders, said charge forming means comprising an air box forming a plenum chamber, an inlet interconnecting said plenum chamber with the atmosphere, a throttle valve disposed in said inlet for controlling the volume of air flowing from the atmosphere into said plenum chamber, a plurality of intake passages having the inner ends thereof communicating with said plenum chamber, the outer ends of each of said passages communicating with said cylinders, each of said intake passages being substantially identical to each other and being adapted to cause the flow therethrough to resonate at some engine operating condition, a fuel pump driven by said engine and having a plurality of separate cells for pumping fuel, a discharge nozzle disposed in each of said passages, each of said cells being connected to one of said nozzles for discharging fuel into said passages, pneumatic means responsive to the pressure in said plenum chamber operatively connected to said pump for varying the quantity of said discharged fuel in proportion to the volume of air flowing through said plenum chamber.

6. Charge forming means for an internal combustion engine having a plurality of cylinders, said charge forming means comprising an air box forming a plenum chamber, an inlet interconnecting said plenum chamber with the atmosphere, a throttle valve disposed in said inlet for controlling the volume of air flowing from the atmosphere into said chamber, a plurality of intake passages having the inner ends thereof communicating with said plenum chamber, the outer ends of each of said intake passages communicating with said cylinders and having intake valves disposed therein for controlling the flow into said cylinders, each of said intake passages being substantially identical to each other and being adapted to cause the flow therethrough to resonate at some engine operating condition, a fuel pump including a plurality of cells, a discharge nozzle disposed in each of said intake passages, each of said cells being connected to one of said nozzles for injecting fuel into said passage when said intake valve is opened, means responsive to the volume of air flowing through said plenum chamber for varying the output of said fuel pump in proportion to said volume of air.

7. Charge forming means for an internal combustion engine having a plurality of cylinders, said charge forming means comprising an air box forming a plenum chamber, an inlet interconnecting said plenum chamber with the atmosphere, a throttle valve disposed in said inlet for controlling the volume of air flowing from the atmosphere into said chamber, a plurality of intake passages having the inner ends thereof communicating with said plenum chamber, the outer ends of each of said passages communicating with said cylinders and having intake valves disposed therein for controlling the flow in said cylinders, each of said passages being substantially identical to each other and being adapted to cause the flow therethrough to resonate at some engine operating condition, a discharge nozzle disposed in each of said passages, a fuel pump including a plurality of cells, each of which is connected to one of said nozzles for injecting fuel into said passage when said intake valve is closed, means responsive to the air pressure in said plenum chamber and operatively connected to said fuel pump for varying the output of said pump in proportion to said volume of air.

8. Charge forming means for an internal combustion engine having a plurality of cylinders, said charge forming means comprising an air box forming a plenum chamber, an inlet interconnecting said plenum chamber with the atmosphere, a throttle valve disposed in said inlet for controlling the volume of air flowing from the atmosphere into said chamber, a plurality of intake passages having the inner ends thereof communicating with said plenum chamber, the outer ends of each of said passages communicating with said cylinders and having intake valves disposed therein for controlling the flow in said cylinders, each of said intake passages being substantially identical to each other and being adapted to cause the flow therethrough to resonate at some particular engine operating condition, a discharge nozzle disposed in each of said intake passages adjacent the intake valve therefor, a fuel pump including a plurality of cells each of which is connected to one of said nozzles for injecting fuel into said passage only when said intake valve is opened, a diaphragm forming one wall of said air box with one side of said diaphragm being exposed to atmospheric air pressure and the other side being exposed to the air pressure in said chamber, said diaphragm being operatively connected to said fuel pump for varying the output of said cells in proportion to the quantity of air flowing therethrough.

9. In an internal combustion engine having a cylinder block with a pair of angularly disposed cylinder banks, an air box disposed in the space between said banks and forming a plenum chamber, an intake to said air box interconnecting said chamber with the atmosphere, a throttle valve disposed in said intake for controlling the flow of air into said chamber, a plurality of intake passages having the inner ends thereof communicating with said plenum chamber, the outer ends thereof communicating with said cylinders, said passages being substantially identical to each other and being tuned to cause the flow therethrough to resonate at at least one engine operating condition, pneumatic means responsive to the air pressure in said air box, a fuel pump driven by said engine and having an output in proportion to the speed thereof, said pump including a separate outlet for each of said intake passages for discharging a quantity of fuel thereinto, means for operatively interconnecting said pneumatic means with said pump for varying the quantity of fuel discharged in proportion to said pressure.

10. In an internal combustion engine having a cylinder block with a pair of angularly disposed cylinder banks, an air box disposed in the space between said banks and forming a plenum chamber, an intake to said air box interconnecting said chamber with the atmosphere, a throttle valve disposed in said intake for controlling the flowing of air into said chamber, a plurality of intake passages having the inner ends thereof communicating with said plenum chamber, the outer ends thereof communicating with said cylinders and having intake valves disposed therein for controlling the flow of air from said intake passages into said cylinders, said intake passages being substantially identical to each other and being tuned to cause the flow therethrough to resonate at at least one engine operating condition, a fuel pump including a plurality of separate cells driven by said engine and having outputs in proportion to the speed thereof, a discharge nozzle disposed in each of said intake passages and being connected to one of said cells for discharging a quantity of fuel into its intake passages when said intake valve is open, means for sensing the volume of air flowing through said plenum chamber, said last mentioned means being operatively connected to said pump for varying said quantity of discharged fuel in proportion to the volume of said air.

11. Charge forming means for use on an internal combustion engine having a plurality of cylinders, said charge forming means comprising an air box forming a plenum chamber, a filter element disposed in said chamber for dividing said chamber into a first compartment and a second compartment, an inlet interconnecting said first compartment with the atmosphere, throttle means disposed in said inlet for controlling the volume of air flowing from the atmosphere into said plenum chamber, a plurality of substantially identical intake passages having the inner ends thereof communicating with said second compartment, the outer ends of each of said passages communicating with one of said cylinders for conducting a charge thereinto, each of said intake passages being substantially identical with each other and being adapted to cause the air flow therein to resonate at some engine operating condition and fuel means for injecting fuel into said charge in proportion to the volume of said air flowing through said plenum chamber.

12. Charge forming means for use on an internal combustion engine having a plurality of cylinders, said charge forming means comprising an air box forming a plenum chamber, a filter element positioned to divide said chamber into a first compartment and a second compartment, an inlet interconnecting said first compartment with the atmosphere, a throttle valve disposed in said inlet for controlling the volume of air flowing from the atmosphere into said first compartment, a plurality of substantially identical intake passages having the inner ends thereof communicating with said second compartment, the outer ends of each of said passages communicating with one of said cylinders, each of said intake passages being substantially identical to each other and being adapted to resonate at some engine operating condition, a fuel pump adapted to inject fuel into said intake passages for mixing with said air, pneumatic means responsive to the pressure in said plenum chamber and being operatively connected to said pump for varying the output thereof in proportion to the volume of air in said induction system.

13. Charge forming means for a multicylinder, internal combustion engine comprising an induction system for charging said cylinders and a fuel injection system for injecting fuel into said charge, said induction system including a plenum chamber, a throttle valve inlet directly interconnecting said plenum chamber with the atmosphere, a plurality of substantially identical intake passages interconnecting said plenum chamber with said cylinders, said intake passages being dimensioned to tend to cause the flow therethrough to resonate and dynamically supercharge said cylinders, said injection system including means for sensing the amount of flow through said induction system and means adapted to inject fuel in proportion thereto into the charge between said throttle valve and said intake valves.

14. An induction system for a multicylinder, internal combustion engine comprising an enlarged plenum chamber, a throttle valve in the inlet to said plenum chamber directly interconnecting said chamber with the atmosphere for regulating the volume of air flowing therethrough, a plurality of substantially identical intake passages adapted to interconnect said plenum chamber with said cylinders, means adapted to sense the volume of air flow through said induction system to transmit a signal indicative thereof to a fuel injection system adapted to inject metered quantities of fuel into the charge posterior to said throttle valve in proportion thereto, said passages being adapted to tend to dynamically supercharge the engine cylinders by ramming the charge thereinto.

15. An induction system for a multicylinder, internal combustion engine, said system comprising an enlarged plenum chamber, an inlet communicating with said plenum chamber for directly interconnecting said chamber with the atmosphere, a throttle valve disposed in said inlet for regulating the volume of air flowing through said system, a plurality of substantially identical intake passages having the inner ends thereof disposed within said plenum chamber and having the outer ends thereof adapted to communicate with said cylinders, means adapted to sense the volume of air flow through said induction system to transmit a signal indicative thereof to a fuel injection system adapted to inject metered quantities of fuel into said intake passages adjacent the outer ends thereof in proportion to said signal, said intake passages being adapted to tend to dynamically supercharge the engine cylinders by ramming the charge thereinto.

16. The method of charging the cylinders of a multicylinder, internal combustion engine comprising throttling the flow of air into a plenum chamber, passing said air through a plurality of substantially identical intake passages having the inner ends communicating with said plenum chamber and the outer ends communicating with said cylinders, sensing the volume of said air flow and creating a signal proportional thereto, injecting fuel into said passages in proportion to said signal, ramming the resultant charge in said passages into said cylinders.

17. The method of charging the cylinders of a multicylinder, internal combustion engine comprising throttling the flow of air into a plenum chamber, directing said air into a plurality of substantially identical intake passages having the inner ends thereof communicating with said plenum chamber and the outer ends thereof communicating with intake valves in said cylinders, opening said valves in timed relation to the operation of said cylinders and drawing said air from said passage into said cylinders, sensing the volume of said air flow and creating a signal proportional thereto, injecting fuel into said passages in proportion to said signal to form a combustible charge, timing the opening and closing of said intake valves in accordance with the dimensions of said passages to resonate the charge flowing through said passage and thereby ramming the charge into said cylinders.

References Cited in the file of this patent
UNITED STATES PATENTS

| | | |
|---|---|---|
| 1,662,040 | Lee | Mar. 6, 1928 |
| 2,008,143 | Mock | July 16, 1935 |
| 2,306,580 | Wilson | Dec. 29, 1942 |
| 2,382,244 | Lundquist et al. | Aug. 14, 1945 |
| 2,563,939 | Kishline | Aug. 14, 1951 |
| 2,636,439 | Mashinter | Apr. 28, 1953 |
| 2,791,205 | Platner | May 7, 1957 |